United States Patent
Shibuya et al.

(10) Patent No.: US 6,333,611 B1
(45) Date of Patent: Dec. 25, 2001

(54) MOTOR DRIVE APPARATUS FOR AN INJECTION MOLDING MACHINE

(75) Inventors: Hiroshi Shibuya; Satoshi Nishida, both of Gunma; Atsushi Koide; Hiroshi Yamaura, both of Nagano, all of (JP)

(73) Assignees: Nisso Electric Company, Gunma-Pref; Nissei Plastic Industrial CO, Ltd., Nagano-Ken, both of (JP)

( * ) Notice: Subject to any disclaimer, the term of this patent is extended or adjusted under 35 U.S.C. 154(b) by 0 days.

(21) Appl. No.: 09/434,466

(22) Filed: Nov. 5, 1999

(30) Foreign Application Priority Data

Nov. 5, 1998 (JP) .................................. 10-314602

(51) Int. Cl.$^7$ ............................... H02P 3/00; B29C 45/76
(52) U.S. Cl. ......................... 318/370; 318/372; 318/373; 318/376; 425/135; 425/145
(58) Field of Search .................................. 318/370–389, 318/393, 700–832, 490; 187/105–119; 363/124; 320/14, 15; 361/18–24; 264/40.1, 40.5, 40.7, 328.1; 425/135, 145, 149, 451.2, 451.4, 451.7

(56) References Cited

U.S. PATENT DOCUMENTS

| | | | |
|---|---|---|---|
| 4,426,610 | * | 1/1984 | Kawada et al. ...................... 318/798 |
| 4,506,766 | * | 3/1985 | Watanabe . | |
| 4,554,999 | * | 11/1985 | Kamaike . | |
| 4,733,146 | * | 3/1988 | Hamby ................................. 318/393 |
| 4,761,600 | * | 8/1988 | D'Atre et al. ....................... 318/759 |
| 5,034,669 | * | 7/1991 | Sako et al. ........................... 318/376 |
| 5,070,290 | * | 12/1991 | Iwasa et al. ......................... 318/758 |
| 5,089,760 | * | 2/1992 | Joyner ................................. 318/798 |
| 5,245,294 | * | 9/1993 | Kumar ................................. 324/677 |
| 5,376,867 | * | 12/1994 | Capetti ................................ 318/376 |
| 5,436,540 | * | 7/1995 | Kumar ................................. 318/375 |
| 5,444,348 | * | 8/1995 | Garrec ................................. 318/640 |
| 5,446,365 | * | 8/1995 | Nomura et al. ......................... 320/14 |
| 5,469,031 | * | 11/1995 | Chorey ................................. 318/375 |
| 5,619,107 | * | 4/1997 | Shinohara et al. ................... 318/139 |
| 5,622,737 | * | 4/1997 | Hehl .................................... 425/590 |
| 5,764,023 | * | 6/1998 | Wieloch .............................. 318/803 |
| 5,814,954 | * | 9/1998 | Suzuki et al. ........................ 318/376 |
| 5,916,501 | * | 6/1999 | Hehl .................................... 264/40.1 |
| 6,058,031 | * | 5/2000 | Lyons et al. ............................ 363/67 |

FOREIGN PATENT DOCUMENTS

A4-278321    10/1992   (JP) .
288979   *  10/1995   (JP) .

* cited by examiner

*Primary Examiner*—Paul Ip
(74) *Attorney, Agent, or Firm*—Birch, Stewart, Kolasch & Birch, LLP.

(57) ABSTRACT

A motor drive apparatus is provided in an injection molding machine in order to supply electrical energy to a motor. The motor drive apparatus includes an electricity accumulation unit for accumulating electrical energy; and an electricity accumulation circuit for accumulating in the electricity accumulation unit electrical energy regenerated from the motor during a deceleration period of the motor and for supplying the electrical energy accumulated in the electricity accumulation unit to the motor during an acceleration period of the motor. By virtue of the above-described structure, when a heavy member such as a screw of an injection apparatus or a movable platen of a mold clamping apparatus is moved at high speed in each molding cycle, at the beginning of movement or during an acceleration period of the motor, the electricity accumulation circuit adds the electrical energy accumulated in the accumulation unit to electrical energy that is supplied from a power source to the motor, and during a deceleration period of the motor, electrical energy regenerated from the motor is accumulated in the accumulation unit.

5 Claims, 4 Drawing Sheets

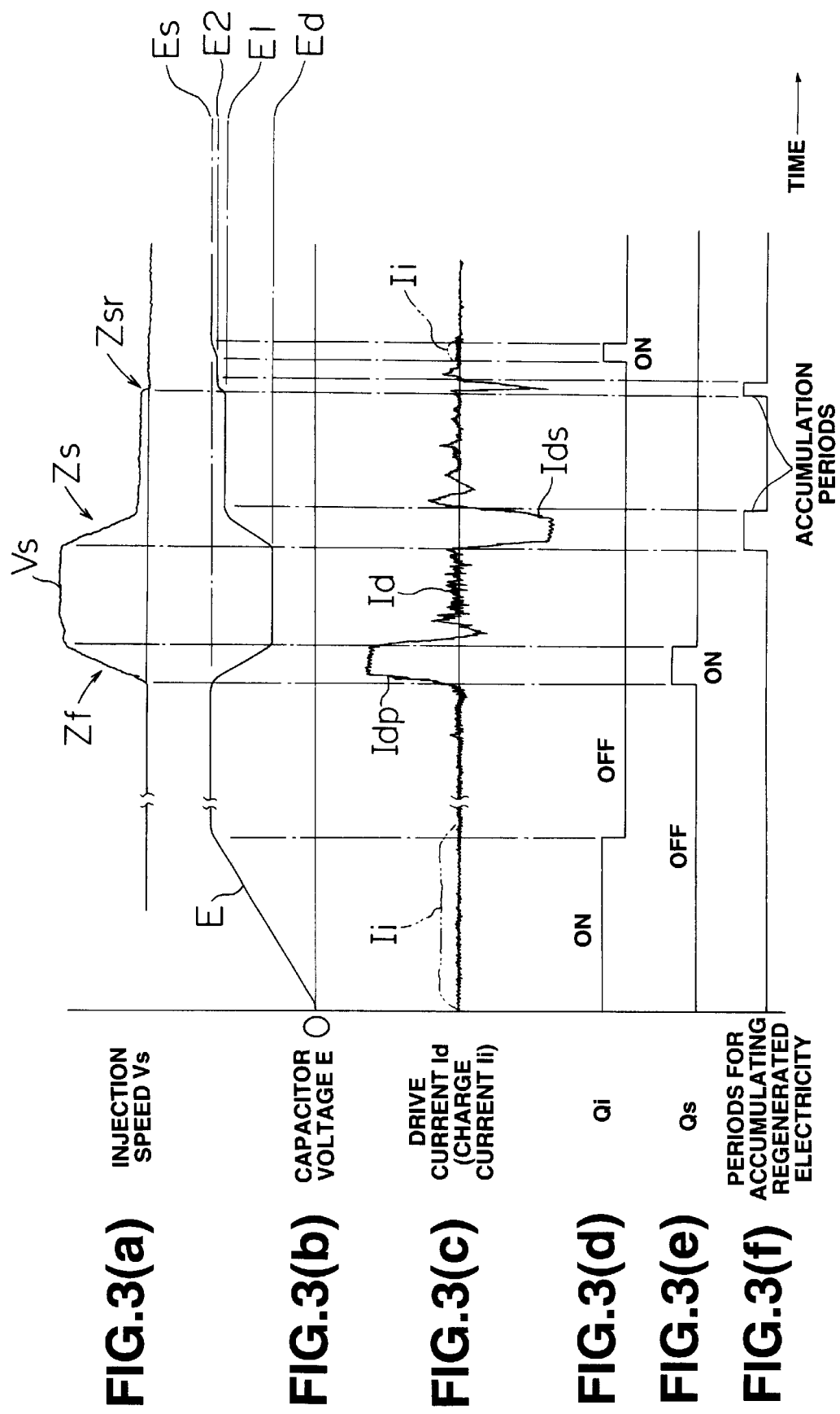

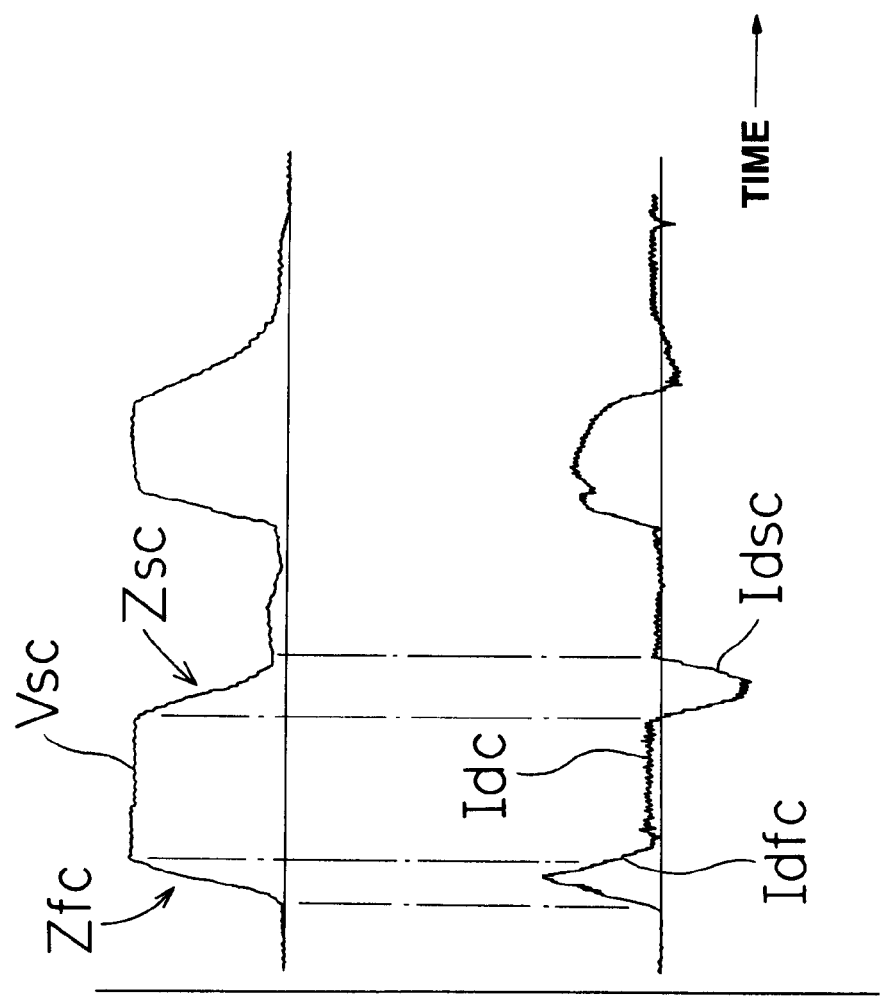

MOTOR DRIVE APPARATUS FOR AN INJECTION MOLDING MACHINE

BACKGROUND OF THE INVENTION

1. Field of the Invention

The present invention relates to a motor drive apparatus used in an injection molding machine and adapted to supply electrical energy to a motor included in an injection apparatus or the like.

2. Description of the Related Art

Generally, an injection apparatus and a mold clamping apparatus—which together constitute a motor-driven-type injection molding machine—each contain an AC servomotor; and in each case electrical energy is supplied from a motor drive apparatus to the corresponding AC servomotor in order to advance and retract a screw provided in the injection apparatus or a movable platen provided in the mold clamping apparatus (see, for example, Japanese Patent Application Laid-Open (kokai) No. 4(1992)-278321).

Incidentally, in an injection step of a molding cycle, an injection operation for advancing at high speed the screw accommodated within a barrel of the injection apparatus is performed, and in a mold clamping step of the molding cycle, a mold open/close operation for advancing and retracting at high speed the movable platen—which is provided in the mold clamping apparatus to support a movable mold—is performed. Similarly, another recurring operation is performed in order to move the screw in a measurement step, and yet another recurring operation is performed in order to move an ejector pin in an ejection step for ejecting a molded product.

As described above, the molding process of the injection molding machine involves an operation for moving a heavy member such as a screw or a movable platen at high speed during each molding cycle. Therefore, at the beginning of movement or during a period in which a motor is accelerated, drive current instantaneously flows through the motor in an amount several times that flowing during a constant speed period subsequent to the acceleration period, and at the end of movement or during a period in which the motor is decelerated, the motor instantaneously generates a considerable amount of regenerative current.

Therefore, in a conventional motor drive apparatus, the circuit must be designed such that, in consideration of excessive drive current (peak current) flowing during the acceleration period, a performance margin is provided, resulting in an increased size of the apparatus and increased cost. In addition, since the regenerative current generated during the deceleration period is consumed and dissipated in the form of heat by use of a regenerative resistor or the like, energy is consumed wastefully.

SUMMARY OF THE INVENTION

An object of the present invention is to provide a motor drive apparatus for an injection molding machine which eliminates the necessity of designing a circuit in consideration of excessive drive current (peak current) flowing during a acceleration period of a motor, to thereby reduce the size of the apparatus and cost.

Another object of the present invention is to provide a motor drive apparatus for an injection molding machine which can avoid wasteful consumption of energy and decrease the capacity of an electric power supply facility within a plant.

To achieve the above objects, the present invention provides a motor drive apparatus provided in an injection molding machine and adapted to supply electrical energy to a motor, the motor drive apparatus comprising an electricity accumulation unit for accumulating electrical energy; and an electricity accumulation circuit for accumulating in the electricity accumulation unit electrical energy regenerated from the motor during a deceleration period of the motor and for supplying the electrical energy accumulated in the electricity accumulation unit to the motor during an acceleration period of the motor. By virtue of the above-described structure, when a heavy member such as a screw of an injection apparatus or a movable platen of a mold clamping apparatus is moved at high speed in each molding cycle, at the beginning of movement or during an acceleration period, the electricity accumulation circuit adds the electrical energy accumulated in the accumulation unit to the electrical energy that is supplied from a power source to the motor, and during a deceleration period, electrical energy regenerated from the motor is accumulated in the accumulation unit. Thus, the electrical energy supplied from the power source is effectively averaged, which eliminates the necessity of designing a circuit in consideration of excessive drive current (peak current) flowing during an acceleration period of the motor. In addition, since the regenerative current generated from the motor during a deceleration period of the motor is accumulated in the accumulation unit as regenerative electrical energy, wasteful consumption of energy can be avoided.

BRIEF DESCRIPTION OF THE DRAWINGS

FIG. 3 is a timing chart showing the operation of the motor drive apparatus shown in FIG. 1; and FIG. 4 is a timing chart showing the operation of a motor drive apparatus according to another embodiment of the present invention.

DETAILED DESCRIPTION OF THE PREFERRED EMBODIMENTS

Embodiments of the present invention will now be described in detail with reference to the drawings. The accompanying drawings are illustrative of the embodiments and are not meant to limit the scope of the invention. For clarification of the invention, detailed description of known parts is omitted.

First, the general structure of an injection molding machine equipped with a motor drive apparatus 1 according to the present embodiment will be described with reference to FIG. 1.

Figure 1:
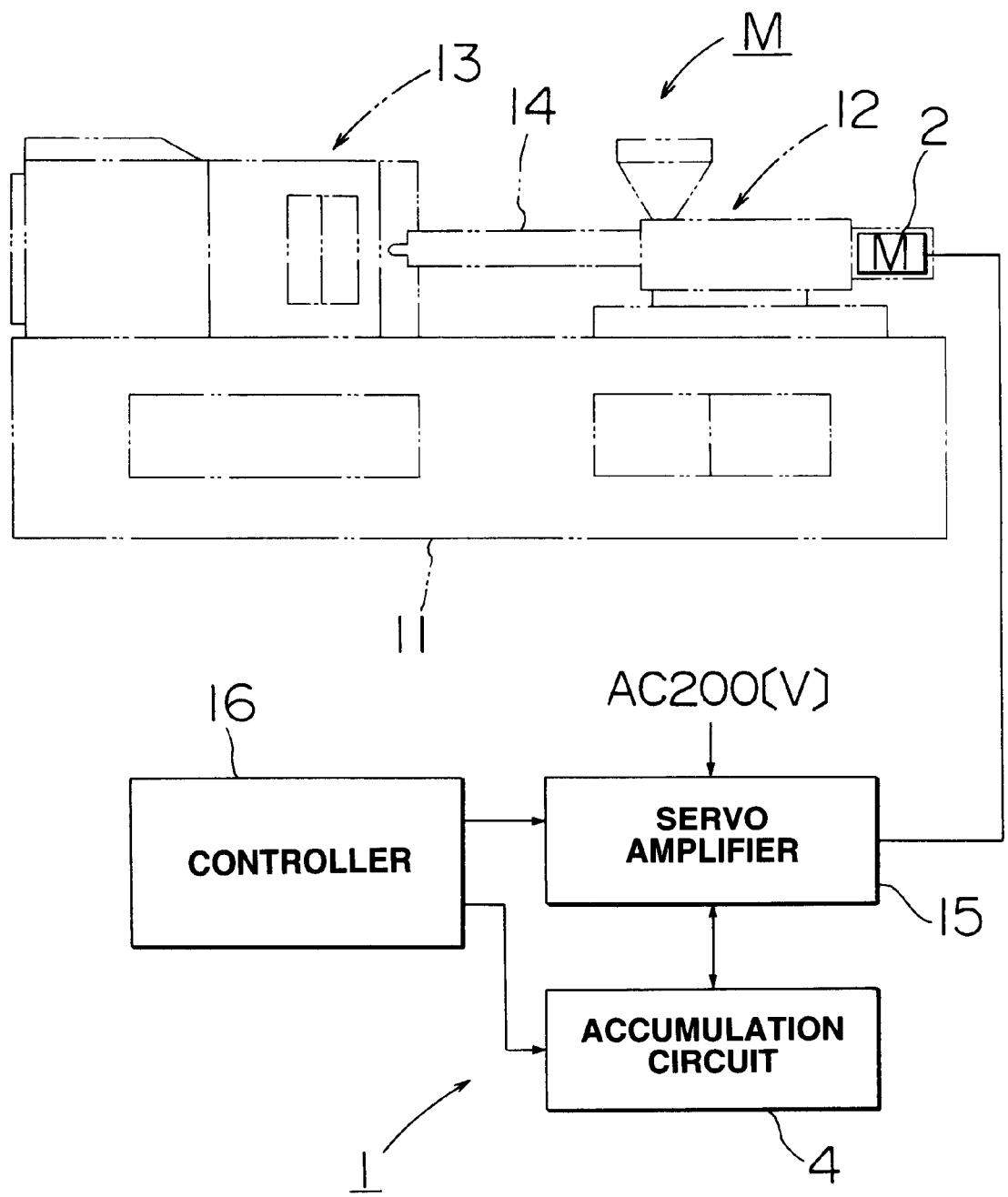
FIG. 1 is a schematic view of an injection molding machine equipped with a motor drive apparatus according to an embodiment of the present invention.

In FIG. 1, reference symbol M denotes an injection molding machine comprising an injection apparatus 12 and a mold clamping apparatus 13 disposed on a machine base 11. The injection apparatus 12 comprises not only a motor 2 for injection (herein after referred to as an "injection motor"), but also a motor for measurement and a motor for nozzle touching, both unillustrated. The mold clamping apparatus 13 comprises a motor for mold clamping and a motor for ejection. Each of the motors is driven and controlled by a motor drive apparatus. Although FIG. 1 shows only the motor drive apparatus 1 connected to the injection motor 2, a similar motor drive apparatus is connected to each of the remaining motors.

The motor drive apparatus 1 has a servo amplifier 15 connected to the injection motor 2. The servo amplifier 15 is controlled by a controller 16. According to the present invention, an electricity accumulation circuit 4 is connected to the servo amplifier 15 and the controller 16. The rotation output of the injection motor 2 is transmitted to a screw accommodated within a barrel 14, via a motion conversion mechanism such as a ball-screw mechanism.

Figure 2:
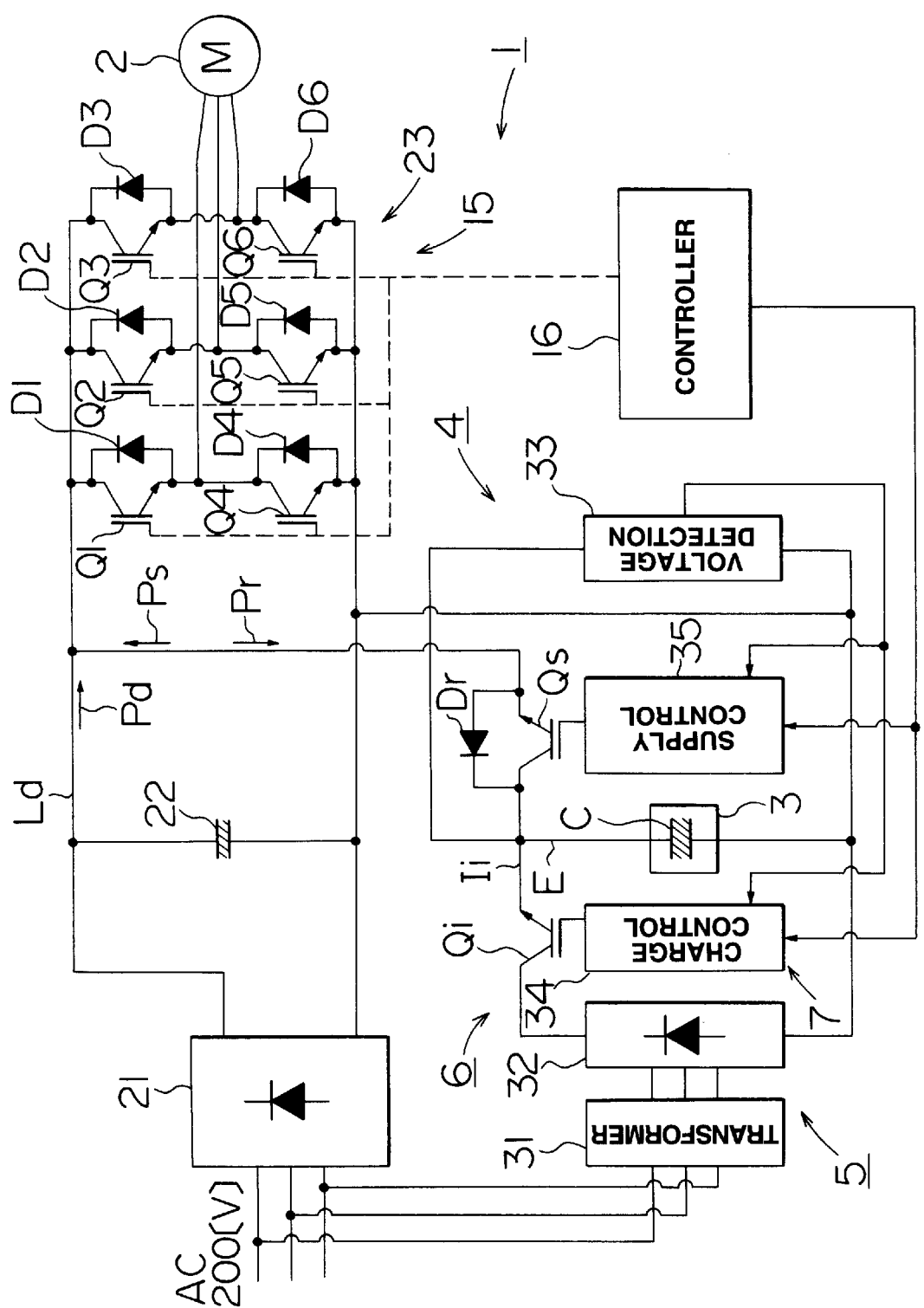
FIG. 2 is a block circuit diagram of the motor drive apparatus shown in FIG. 1.

Next, the specific structure of the motor drive apparatus 1 according to the present embodiment will be described with reference to FIG. 2.

The servo amplifier 15 has a converter (rectification circuit) 21 to which AC voltage (200 V) is supplied. The output of the converter 21 is connected to the injection motor (three-phase AC servomotor) 2 via a smoothing capacitor 22 and a power driver 23 including power transistors Q1, Q2, Q3, Q4, Q5, and Q6. Each of the power transistors Q1, etc. is controlled by means of a control signal output from the controller 16. Diodes D1, D2, D3, D4, D5, and D6 are connected in parallel to the power transistors Q1, Q2, Q3, Q4, Q5, and Q6, respectively, in order to allow regenerative current to pass through the diodes D1, D2, D3, D4, D5, and D6.

The electricity accumulation circuit 4 comprises a transformer 31 for stepping up the AC voltage (200 V), and a converter (rectification circuit) 32 connected to the secondary winding of the transformer 31. The DC output of the converter 32 is connected via a control transistor Qi to a capacitor C (electricity accumulation unit 3) for electrical energy accumulation having a relatively large capacitance. A voltage detection section 33 for detecting the voltage (terminal voltage) E of the capacitor C is connected to the capacitor C. The control transistor Qi is controlled by a charge control circuit 34, which is controlled by the controller 16 and the voltage detection section 33. In the present embodiment, the transformer 31 and the converter 32 constitute a charge circuit 5, whereas the control transistor Qi, the voltage detection section 33, the charge control circuit 34, and the controller 16 constitute a charge control function section 6.

The capacitor C is connected via a control transistor Qs to an electricity supply line Ld for supplying drive current Id to the motor 2. The control transistor Qs is controlled by a supply control circuit 35, which is controlled by the controller 16 and the voltage detection section 33. A diode Dr is connected in parallel to the control transistor Qs in order to allow regenerative current to flow through the diode Dr. In the present embodiment, the control transistor Qs, the voltage detection section 33, the supply control circuit 35, and the controller 16 constitute a supply control function section 7.

Next, the operation of the motor drive apparatus 1 according to the present embodiment will be described with reference to FIGS. 2 and 3. Specifically, the operation of the motor drive apparatus 1 during an injection step will be described.

First, upon being switched on, the charge control function section 6 causes the charge circuit 5 to charge the accumulation unit 3 to an accumulation voltage Es. At this time, the AC voltage (200 V) supplied to the transformer 31 is stepped up to 300–350 V, and is then converted (rectified) into DC by the converter 32. Meanwhile, a charge command signal is output from the controller 16 to the charge control circuit 34, so that the control transistor Qi is turned on (FIG. 3(d)). Consequently, the capacitor C is charged with constant current Ic regulated by the transistor Qi (FIG. 3(c)). When the voltage of the capacitor C reaches a desired accumulation voltage Es, the transistor Qi is turned off (FIGS. 3(b) and 3(d)). In this case, the voltage detection section 33 monitors the voltage E of the capacitor C and turns off the transistor Qi when the voltage E reaches the accumulation voltage Es. In the present embodiment, the accumulation voltage Es is set to 500 V.

Also, upon being switched on, the AC voltage (200 V) is supplied to the converter 21 to be converted (rectified) into a DC voltage, and is then smoothed by the smoothing capacitor 22. The thus-obtained DC voltage (270 V) is supplied to the power driver 23.

In the injection step, upon reception of an injection start command signal, the controller 16 outputs control signals to the respective transistors Q1, etc. As a result, the motor 2 is driven and controlled such that the screw included in the injection apparatus 12 advances at a preset injection speed Vs (FIG. 3(a)). In this case, the power driver 23 generates a three-phase alternating current from the drive voltage Ed input to the drive 23 and supplies the three-phase alternating current to the motor 2.

Further, upon receipt of the injection start command signal, the supply control circuit 35 turns on the control transistor Qs (FIG. 3(e)). At this time, the drive voltage Ed of the electricity supply line Ld is 270 V, and the capacitor C has been charged to the desired accumulation voltage Es (500 V). Therefore, current flows from the capacitor C to the electricity supply line Ld. That is, the electrical power Ps accumulated in the capacitor C is added to a drive power Pd supplied form the power source side (the converter 21 side). A predetermined period commencing immediately after receipt of the injection start command signal serves as an acceleration period Zf in which the motor 2 starts its rotation and the rotational speed reaches a preset injection speed Vs, so that an excessively large drive current (peak current) Idp is supplied to the motor 2. However, the greater portion of the drive current Idp is provided by the accumulated electric power Ps (FIG. 3(c)). Accordingly, the electric power Pd supplied from the power source is averaged, which eliminates the necessity of designing a circuit in consideration of the excessive drive current Idp (peak current), to thereby reduce the size of the apparatus and cost. In addition, since no excessive drive current flows, the capacity of a power supply facility in a plant can be decreased.

After the rotation speed of the motor 2 has reached the injection speed Vs, a relatively small, ordinary drive current Id flows through the motor 2. Therefore, the control transistor Qs is turned off by the supply control circuit 35. In the above-described operation, the voltage E of the capacitor C decreases due to the discharging thereof. The voltage E of the capacitor C is monitored by the voltage detection section 33, and when the voltage E decreases to a drive voltage Ed, the transistor Qs is turned off.

Meanwhile, upon receipt of an injection end command signal after completion of injection, the controller 16 stops issuance of the control signals to the transistors Q1, etc. A predetermined period commencing immediately after receipt of the injection end command signal serves as a deceleration period Zs in which the motor 2 decelerates and regenerates electric power Pr. Due to the regenerated electric power Pr, regenerative current Ids flows to the capacitor C via the diodes D1, etc. and the diode Dr, so that the capacitor C is charged (FIGS. 3(c) and 3(f)). As the capacitor is charged upon deceleration of the motor 2 to a predetermined speed, the voltage E of the capacitor C increases. FIG. 3(b) shows the case in which the voltage E of the capacitor C reaches a voltage E1 (e.g., 450 V) due to accumulation of the regenerated electric power Pr. As described above, since the regenerative current Ids generated in the deceleration period Zs of the motor 2 is accumulated in the accumulation unit 3 as the regenerated electric power Pr, wasteful energy consumption is avoided.

If the motor 2 subsequently enters an acceleration period, the charge control function section 6 causes the charge circuit 5 to charge the accumulation unit 3 to the accumulation voltage Es (500 V). That is, when the voltage E of the capacitor C—which is monitored by the voltage detection section 33—is lower than the desired accumulation voltage Es, the control transistor Qi is turned on, before the acceleration period Zf of the motor 2 starts, in order to charge the capacitor to the desired accumulation voltage Es. However, in the illustrated example (FIG. 3), after the end of the deceleration period Zs, the motor 2 enters another deceleration period Zsr commencing after a pressure holding step. Therefore, the present status is maintained, and after the deceleration period Zsr, the control transistor Qi is turned on in order to charge the capacitor C to the desired accumulation voltage Es (FIGS. 3(c) and 3(d)). FIG. 3(b) shows the case in which the voltage E of the capacitor C reaches a voltage E2 (e.g., 470 V) due to accumulation of the regenerated electric power Pr, and subsequently, the control transistor Qi is turned on in order to return the voltage E of the capacitor C to the desired accumulation voltage Es (500 V). The above-described operation is performed in the injection step of each molding cycle.

The present invention is not limited to the above-described embodiments. Regarding structural details, shape, method, and the like, modifications and any omission or addition may be possible as needed without departing from the scope of the invention. For example, in the above-described embodiment, the capacitor C constitutes the charge accumulation unit 3. However, other devices, such as a battery, that provide the same function can be used to constitute the electricity accumulation unit 3. Although the embodiment has been described with reference to the motor drive apparatus 1 for the injection motor 2, the present invention can be applied to respective motor drive apparatuses for a measurement motor; a mold clamping motor and an ejection motor of the mold clamping apparatus 13; and a pump motor used in the case where the molding machine is of a hydraulic type. FIGS. 4(a) and 4(b) show a mold clamping step of the mold clamping apparatus 13. In these drawings, Vsc represents mold closing speed, Idc represents drive current, Idfc represents drive current during an acceleration period Zfc of the motor, and Idsc represents regenerative current during a deceleration period Zsc of the motor.

The control in the above-described injection step (the injection apparatus) can be implemented in basically the same manner. When a plurality of motor drive apparatuses corresponding to the respective steps are provided, an arbitrary motor drive apparatus may be driven by use of electrical energy accumulated in other motor drive apparatus(es). Further, there may be performed failsafe control in which, upon power failure, the screw of the injection apparatus and/or the movable platen of the mold clamping apparatus—each of which is driven by a motor drive apparatus—is moved to and stopped at a safer position by use of accumulated electrical energy.

What is claimed is:

1. A motor drive apparatus provided in an injection molding machine and adapted to supply electrical energy to a motor, said motor drive apparatus comprising:

an electricity accumulation unit for accumulating electrical energy; and an electricity accumulation circuit for accumulating into said electricity accumulation unit electrical energy regenerated from said motor during a deceleration period of said motor and for supplying the electrical energy accumulated in said electricity accumulation unit to said motor during an acceleration period of said motor, wherein said electricity accumulation circuit comprises a charge circuit for charging said electricity accumulation unit to an electricity accumulation voltage higher than a drive voltage of said motor.

2. A motor drive apparatus according to claim 1, wherein said electricity accumulation circuit comprises a charge control function section which causes said charge circuit to charge said electricity accumulation unit to said electricity accumulation voltage when said motor drive apparatus is turned on.

3. A motor drive apparatus according to claim 2, wherein said electricity accumulation circuit comprises a charge control function section which causes said charge circuit to charge said electricity accumulation unit to said electricity accumulated voltage before said motor enters an acceleration period.

4. A motor drive apparatus according to claim 1, wherein said electricity accumulation circuit comprises a supply control function section which supplies the accumulated electrical energy to said motor only in an acceleration period of said motor.

5. A motor drive apparatus according to claim 1, wherein said electricity accumulation unit comprises a capacitor.

* * * * *